(12) United States Patent
Jeon et al.

(10) Patent No.: US 10,365,713 B2
(45) Date of Patent: Jul. 30, 2019

(54) METHOD AND APPARATUS FOR PROVIDING INTERFACE RECOGNIZING MOVEMENT IN ACCORDANCE WITH USER'S VIEW

(71) Applicant: STARSHIP VENDING-MACHINE CORP., Seoul (KR)

(72) Inventors: Su-young Jeon, Seoul (KR); Ji-yong Kwon, Seoul (KR)

(73) Assignee: STARSHIP VENDING-MACHINE CORP., Seoul (KR)

(*) Notice: Subject to any disclaimer, the term of this patent is extended or adjusted under 35 U.S.C. 154(b) by 0 days.

(21) Appl. No.: 15/416,553

(22) Filed: Jan. 26, 2017

(65) Prior Publication Data

US 2017/0139478 A1   May 18, 2017

Related U.S. Application Data (63) Continuation of application No. PCT/KR2015/006476, filed on Jun. 25, 2015.

(30) Foreign Application Priority Data

Aug. 1, 2014  (KR) .................. 10-2014-0098842

(51) Int. Cl.
  *G06F 3/01*   (2006.01)
  *G06F 3/0481*   (2013.01)
  *G06T 15/20*   (2011.01)

(52) U.S. Cl.
  CPC .............. *G06F 3/013* (2013.01); *G06F 3/017* (2013.01); *G06F 3/04815* (2013.01); *G06T 15/20* (2013.01)

(58) Field of Classification Search
  CPC ........... G06F 3/011; G06F 3/013; G06F 3/017
  See application file for complete search history.

(56) References Cited

U.S. PATENT DOCUMENTS

| | | | |
|---|---|---|---|
| 2002/0097218 A1 | 7/2002 | Gutta | |
| 2005/0248529 A1* | 11/2005 | Endoh | ..................... G06F 3/011 345/156 |
| 2008/0309660 A1* | 12/2008 | Bertolami | ............... A63F 13/10 345/419 |
| 2012/0229377 A1 | 9/2012 | Kim | |
| 2014/0184494 A1 | 7/2014 | Burachas | |

FOREIGN PATENT DOCUMENTS

| | | |
|---|---|---|
| JP | 2005-321869 A | 11/2005 |
| JP | 2010-170562 A | 8/2010 |
| JP | 2013-093787 A | 5/2013 |
| KR | 10-2010-0129629 A | 12/2010 |
| KR | 10-1082829 B1 | 11/2011 |

(Continued)

*Primary Examiner* — Alexander Eisen
*Assistant Examiner* — Cory A Almeida
(74) *Attorney, Agent, or Firm* — Korus Patent, LLC; Seong Il Jeong (57) ABSTRACT

An embodiment of the present invention enables 2D pointing technology to be used in a 3D space, thereby proving an intuitive 3D user interface. More particularly, an embodiment of the present invention implements an action point that enables an eye and finger of a user and an action point on a screen to be arranged on a rectilinear line, thereby providing an intuitive user interface.

12 Claims, 7 Drawing Sheets

(56) References Cited

FOREIGN PATENT DOCUMENTS

| KR | 10-2012-0070133 A | 6/2012 |
|----|-------------------|--------|
| KR | 10-2012-0126508 A | 11/2012 |
| KR | 10-2012-0136719 A | 12/2012 |
| KR | 10-2014-0005233 A | 1/2014 |
| WO | 2012/082971 A | 6/2012 |

* cited by examiner

METHOD AND APPARATUS FOR PROVIDING INTERFACE RECOGNIZING MOVEMENT IN ACCORDANCE WITH USER'S VIEW

TECHNICAL FIELD

The present invention relates to a method and apparatus for providing an interface capable of recognizing an action by considering a user's viewpoint, and more particularly to a method and apparatus for providing an interface, which enables a user's viewpoint to consist with an action point on a screen on which a user interface is displayed, thereby providing an intuitive user interface.

BACKGROUND ART

NUI is an abbreviation for Natural User Interface. An NUI refers to an interface designed to command a computer via a method more intuitive for a human, such as a method using voices, gestures or the like of a user, unlike a Text User Interface (TUI) based on a commanding system via the input of text or a Graphical User Interface (GUI) designed to command a computer by manipulating pictures inside a screen via a touch pad and a mouse.

An NUI device is an input device that is required to implement the above-described NUI. An NUI device may be commonly composed of a microphone configured to recognize voices of a user and an RGB camera and/or a depth camera configured to recognize gestures of a user. Such NUI devices have various specifications based on the types thereof. Commonly, applications designed to photograph all or part of the body of a user and utilize the three-dimensional (3D) NUI thereof chiefly recognize the 3D location of a hand or finger of a user and utilize the recognized 3D location like a cursor for a mouse. More specifically, NUI devices are implemented such that a user moves the location of a cursor on a screen by moving his or her hand up, down, left and right in front of the screen and issues a command by further stretching his or her hand and pressing a button located on the screen. Korean Patent Application Publication No. 10-2012-0070133 (published on Jun. 29, 2012) also discloses such a technology.

However, these methods have the following problems. The location of a hand does not consist with the location of a cursor on a screen from a user's viewpoint, and the user naturally views the screen so as to perform interaction based on the cursor on the screen, with the result that the user cannot view his or her hand. Accordingly, the user unnaturally moves his or her hand so as to move the cursor within the screen, and thus a longer time and a more effort are required to perform input at a level identical to that of input via a mouse.

Meanwhile, the above-described background technology corresponds to technical information that has been possessed by the present inventor in order to contrive the present invention or that has been acquired in the process of contriving the present invention, and cannot be necessarily viewed as a well-known technology that had been known to the public before the filing of the present invention.

DISCLOSURE

Technical Problem

An object of an embodiment of the present invention is to enable the location of a hand of a user to consist with the location of an action point of a user interface displayed on a screen when viewed from the user's viewpoint.

Technical Solution

As a technical solution for accomplishing the above-described object, according to a first aspect of the present invention, there is provided a method for providing an interface capable of recognizing an action by considering a user's view point, which is performed via an apparatus for providing an intuitive interface, the method including: (A) collecting information about the 3D location of an eye of a user, information about the 3D location of a hand of the user, and information about the 3D locations of the vertices of the screen of an image display device; (B) mapping the information about the 3D location of the hand into a normal space of a preset volume between the eye and the screen; (C) converting the information about the 3D location of the hand, mapped into the normal space, into information about a location in a virtual space within the screen by projecting the mapped information about the 3D location of the hand onto the screen of the image display device; and (D) determining the information about the location in the virtual space within the screen to be the location of an action point for manipulating of a user interface provided to the screen.

Meanwhile, according to a second aspect of the present invention, there is provided an apparatus for providing an interface capable of recognizing an action by considering a user's view point, the apparatus including: a location information collection unit configured to collect information about the 3D location of an eye of a user, information about the 3D location of a hand of the user, and information about the 3D locations of the vertices of the screen of an image display device; a mapping unit configured to map the information about the 3D location of the hand into a normal space of a preset volume between the eye and the screen; a screen location information generation unit configured to convert the information about the 3D location of the hand, mapped into the normal space, into information about a location in a virtual space within the screen by projecting the mapped information about the 3D location of the hand onto the screen of the image display device; and a user interface manipulation unit configured to determine the information about the location in the virtual space within the screen to be the location of an action point for manipulating a user interface provided to the screen.

Meanwhile, according to a third aspect of the present invention, there is provided a computer program stored in a computer-readable storage medium to perform the method for providing an interface capable of recognizing an action by considering a user's view point according to the first aspect.

Meanwhile, according to a fourth aspect of the present invention, there is provided a computer-readable storage medium having stored thereon a computer program code for performing the method for providing an interface capable of recognizing an action by considering a user's view point according to the first aspect.

Advantageous Effects

Conventional intuitive point technology via an eye-finger direction can be used only to two dimensionally input coordinates (for example, as in a touch screen). When 3D coordinates are input, an eye-finger direction does not consist with an action point displayed on a screen, and thus an intuitive interface cannot be implemented. However, an embodiment of the present invention enables the two-dimensional (2D) pointing technology to be used in a 3D space, thereby proving an intuitive 3D user interface.

Furthermore, the apparatus according to an embodiment of the present invention can be used for various purposes, such as a substitution for a mouse in a GUI-based program, a substitution for a remote control on a TV screen, a substitution for a laser pointer on a presentation screen, and the like.

Furthermore, when information about the 3D locations of the vertices of a screen is calculated after an initial setting operation of pointing to the vertices of the screen has been performed in order to use an intuitive 3D user interface, computation is performed by considering a small number of variables, and thus the time required for a user to perform an initial setting operation can be reduced.

MODE FOR INVENTION

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to descriptions are omitted in order to clearly describe the present invention, and similar reference symbols are assigned to similar components throughout the specification.

Throughout the specification, when a part is described as being connected to another part, this includes not only a case where they are directly connected to each other but also a case where they are electrically connected to each other with another element interposed therebetween. Furthermore, when a part is described as including a component, this means that another component is not be excluded from the part but may be included in the part, unless particularly described to the contrary.

The present invention will be described in detail below with reference to the accompanying diagrams.

Figure 1:
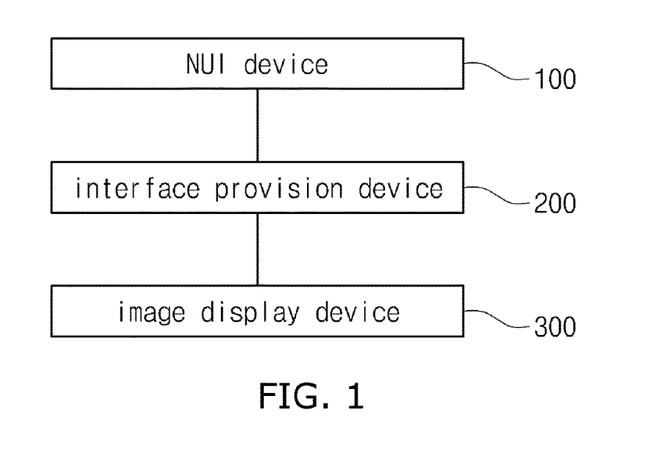
FIG. 1 is a diagram showing the configuration of a system for providing an interface capable of recognizing an action by considering a user's viewpoint according to an embodiment of the present invention.

Referring to FIG. 1, a system 10 according to an embodiment of the present invention includes an NUI device 100, an interface provision device 200, and an image display device 300.

The NUI device 100 refers to any device that can recognize an action, pose or voice of a user by means of at least one of an image sensor, a depth sensor, and a voice recognition sensor and that can use the recognized action, pose or voice as a command for a software program or an application. Representatives of the NUI device 100 may include a microphone, a color camera, a depth camera, etc. that can recognize a voice, gesture or the like of a user. The NUI device 100 according to an embodiment of the present invention is preferably a device that is capable of photographing an action of a user and extracting action recognition information, like a depth camera and/or a color camera.

The NUI device 100 generates recognition information (for example, a depth value, or a color value), including at least one of information about the location of a hand, finger or joint of a user, information about the rotation of the hand, finger or joint of the user, and information about the opening or clenching of a hand of the user, by photographing all or part of the body of the user, and transmits the recognition information to the interface provision device 200 via a wired/wireless communication means.

The interface provision device 200 provides an intuitive user interface via the image display device 300. Furthermore, the interface provision device 200 generates action information by analyzing the action of the user via the recognition information received from the NUI device 100, executes a user interface in accordance with the generated operation information, and transfers the generated operation information to the image display device 300. That is, the interface provision device 200 analyzes the action of the user, and transmits the results of the operation of the user interface corresponding to the action of the user to the image display device 300 via the wired/wireless communication means.

The interface provision device 200 may be implemented as a computer, a portable terminal, a television, a wearable device or the like that is connectable to another terminal and a server. In this case, the computer includes, for example, a notebook, a desktop, a laptop, etc. on which a web browser has been installed. The portable terminal is, for example, a wireless communication device ensuring portability and mobility, and may include all types of handheld-based wireless communication devices, such as a smartphone. Furthermore, the wearable device is, for example, an information processing device of a type that can be directly worn on a human body, such as a watch, glasses, an accessory, a dress, shoes, or the like, and may be connected to a remote server or another terminal over a network directly or by way of another information processing device.

The image display device 300 is a device for displaying an interactive interface in accordance with the execution information received from the interface provision device 200, and may be any type of device capable of displaying an image, such as a computer monitor, a TV, a projector, Google Glasses, or the like.

Meanwhile, the interface provision device 200 may be configured to include the image display device 300. For example, there is a case where the interface provision device 200 is a device on which a display module is mounted, such as a notebook, a smartphone, a tablet PC, or the like.

Figure 2:
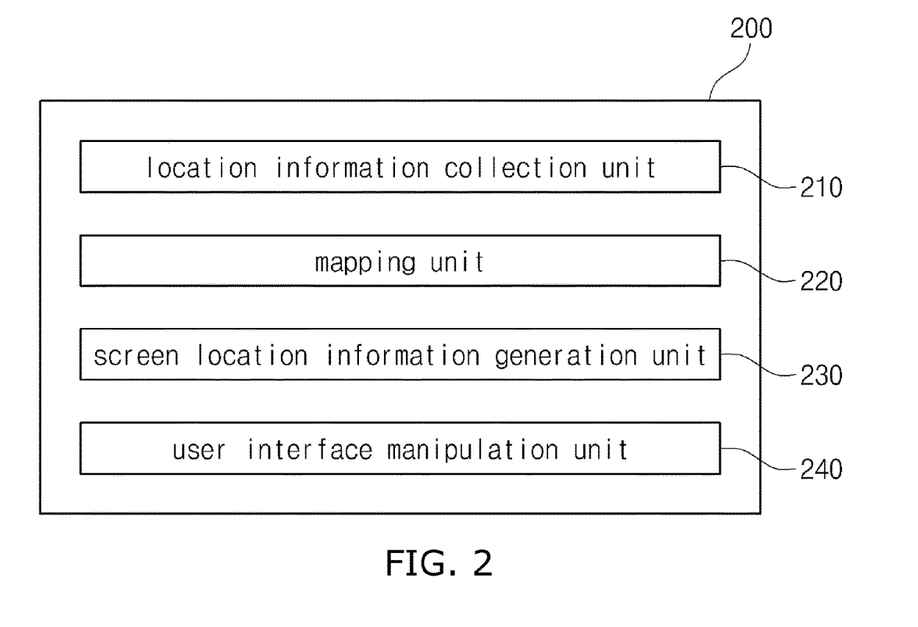
FIG. 2 is a block diagram showing the internal configuration of an apparatus for providing an interface capable of recognizing an action by considering a user's viewpoint according to an embodiment of the present invention.

The configuration of the interface provision device 200 according to an embodiment of the present invention will be described in greater detail with reference to FIGS. 2 and 3.

The interface provision device 200 includes a location information collection unit 210, a mapping unit 220, a screen location information generation unit 230, and a user interface manipulation unit 240.

The location information collection unit 210 collects information about the 3D location of an eye of the user, information about the 3D location of a hand (including fingers) of the user, and information about the 3D locations of the four vertices of the screen of the image display device 300.

Figure 3:
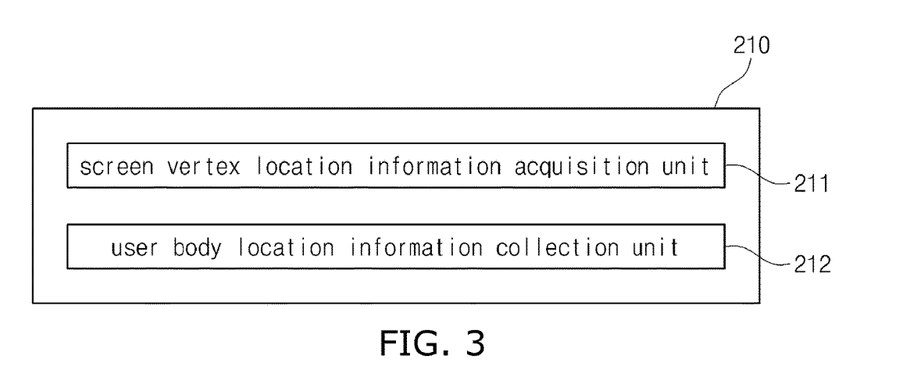
FIG. 3 is a block diagram showing the internal configuration of the location information collection unit of FIG. 2.

For this purpose, referring to FIG. 3, the location information collection unit 210 includes a screen vertex location information acquisition unit 211, and a user body location information collection unit 212. To provide the intuitive user interface, information about the 3D locations of the vertices of the screen needs to be acquired or stored in advance. Accordingly, the information about the 3D locations of the four vertices of the screen is acquired in such a way that the user is prompted to perform initial setting before performing an action of manipulating the user interface. The screen vertex location information acquisition unit 211 is a component for performing the initial setting. Furthermore, the user body location information collection unit 212 is a component for collecting information about the 3D location of the body (eye and hand) of the user in order to manipulate the user interface after performing the initial setting. The operations of the respective components will be described in detail below.

First, the screen vertex location information acquisition unit 211 requests the user to perform an initial setting operation for pointing to vertices of the screen via the user interface. Thereafter, the user performs an action of pointing to each of the vertices by using his or her hand or finger. In this case, although the user may perform an initial setting operation of pointing to one vertex at only one location away from the image display device 300, the user may perform initial setting operations for the one vertex at various locations. To acquire information about the more accurate 3D locations of the vertices, initial setting operations are preferably performed for each of the vertices at five or more different locations. The performance of initial setting operations is not necessarily limited thereto, but initial setting operations may be performed at a different number of different locations.

The NUI device 100 acquires information about the 3D location of the eye of the user and information about the 3D location of the hand (including fingers) from each initial setting operation of the user, and transfers the acquired information to the screen vertex location information acquisition unit 211. For example, when the user performs initial setting operations at five different locations for one vertex, a total of five pairs (information about the 3D location of the eye, information about the 3D location of the hand) may be acquired for one vertex.

In the following, for ease of description, "information about the 3D location of the eye of the user=$e_p^i$," "information about the 3D location of the hand of the user=$h_p^i$," and "information about the 3D locations of the four vertices of the screen of the image display device 300=$d_{lt}$, $d_{rt}$, $d_{lb}$, and $d_{rb}$" are assumed. In this case, p is a value representative of a vertex, and is any one of lt, rt, lb, and rb. i is the number of a round at which an initial setting operation is performed at one location for one vertex, and is an integer larger than 0. lt refers to a left upper end, rt refers to a right upper end, lb refers to a left lower end, and rb refers to a right lower end. For reference, $d_{lt}$ refers to a left upper vertex, $d_{rt}$ refers to a right upper vertex, $d_{lb}$ refers to a left lower vertex, and $d_{rb}$ refers to a right lower vertex. Furthermore, $e_p^i$ and $h_p^i$ are values that are measured by the NUI device 100 and that are known already, whereas $d_{lt}$, $d_{rt}$, $d_{lb}$, and $d_{rb}$ are values that are measurement targets, so they are variables.

The screen vertex location information acquisition unit 211 may acquire $d_{lt}$, $d_{rt}$, $d_{lb}$, and $d_{rb}$ by applying the pair ($e_p^i$, $h_p^i$) for each vertex into a least-square method for optimizing a energy function. An energy function E for applying the least-square method is expressed as shown in Equation 1 below:

$$E = E_l + \lambda E_q \quad \text{<Equation 1>}$$

$E_l$ is a first factor for measuring a distance between a 3D rectilinear line passing through ($e_p^i$, $h_p^i$) and a corresponding vertex. In other words, $E_l$ mathematizes a strong possibility that a vertex is present at a point where virtual rays formed via the location of the eye and the location of the finger input by the user intersect each other. $E_l$ may be incarnated as Equations 2 and 3 below:

$$E_l = \sum_{p \in \{lt,rt,lb,rb\}} \sum_{i=1}^{N_p} \left( (I - I_p^i (I_p^i)^T) d_p + e_p^i - (e_p^i \cdot I_p^i) I_p^i \right)^2 \quad \text{<Equation 2>}$$

$$I_p^i = \frac{h_p^i - e_p^i}{|h_p^i - e_p^i|} \quad \text{<Equation 3>}$$

In this case, $N_p$ is a value representative of the number of pairs ($e_p^i$, $h_p^i$) which point to a vertex p.

Thereafter, $E_q$ is a second factor for determining whether a polygon formed by connecting the four vertices of the screen becomes a rectangle. $E_q$ is an equation for the size of an inner product between vectors each connecting two neighboring vertices of the four vertices of the screen. That is, this is an equation that is generated by using the fact that when an inner product between vectors is close to 0, it can be determined that the vectors are perpendicular to each other. When $E_q$ is expressed more specifically, Equation 4 below is given:

$$E_q = ((d_{rt} - d_{lt}) \cdot (d_{lb} - d_{lt}))^2 + ((d_{lt} - d_{rt}) \cdot (d_{rb} - d_{rt}))^2 + ((d_{rb} - d_{lb}) \cdot (d_{lt} - d_{lb}))^2 + ((d_{lb} - d_{rb}) \cdot (d_{rt} - d_{rb}))^2 \quad \text{<Equation 4>}$$

$\lambda$ is a weight for determining importance between $E_l$ and $E_q$, and is a value preset as a numerical value appropriate for the interface provision device 200. In the case of $E_q$, the value thereof increases when the four vertices do not form a rectangular shape, but a variation in the value decreases when the four vertices is similar to a rectangular shape. $E_q$ is a condition that must be satisfied if possible. Meanwhile, in the case of $E_l$, for each of the vertices, as the vertex becomes closer to a rectilinear line passing through ($e_p^i$, $h_p^i$), the value thereof decreases. However, since the value of ($e_p^i$, $h_p^i$) is not always accurate, it is preferred that $\lambda$ is preset such that a larger weight is assigned to $E_q$. For example, $\lambda$ may be designated as a value of about 15.0.

In summary, when both $E_l$ and $E_q$ have minimum values, information about the 3D locations of the vertices best corresponding to the locations of the four vertices of the actual screen can be acquired, and thus the screen vertex location information acquisition unit 211 acquire $d_{lt}$, $d_{rt}$, $d_{lb}$, and $d_{rb}$ that enable the energy function to have a minimum value.

Meanwhile, the screen vertex location information acquisition unit 211 can acquire information about the 3D locations of the four vertices by using only $E_l$ of the factors of the energy function. In this case, the computational load required for the acquisition of the information about the 3D locations of the four vertices is decreased. For example, an initial solution to the information about the 3D locations of the four vertices can be acquired within about two seconds. Furthermore, the variables applied to an energy function equation are designated as information about the 3D locations of four variables, and a total of 12 variables are designated. Accordingly, since the number of dimensions is small, an initial setting step can be performed within 5 minutes even when the time required for the input of the eye and location of the user for each of the vertices is added.

Meanwhile, the screen vertex location information acquisition unit 211 may acquire information about the more accurate 3D locations of the four vertices of the screen by additionally applying an iterative nonlinear optimization method, such as a gradient descent method, a Levenberg-Marquadt method, or the like.

After the initial setting step has been completed, the user body location information collection unit 212 provides the user interface via the image display device 300, and collects information about the 3D locations of the eye and hand of the user for the manipulation of the user interface. The NUI device 100 generates the information about the 3D locations of the eye and the hand from an action of the user, and the user body location information collection unit 212 collects the information about the 3D locations of the eye and the hand received from the NUI device 100.

To map an actual space where the hand of the user is located to a virtual space within the screen, the mapping unit 220 maps the information about the 3D location of the hand into a normal space of a preset volume between the eye and the screen.

Figure 4:
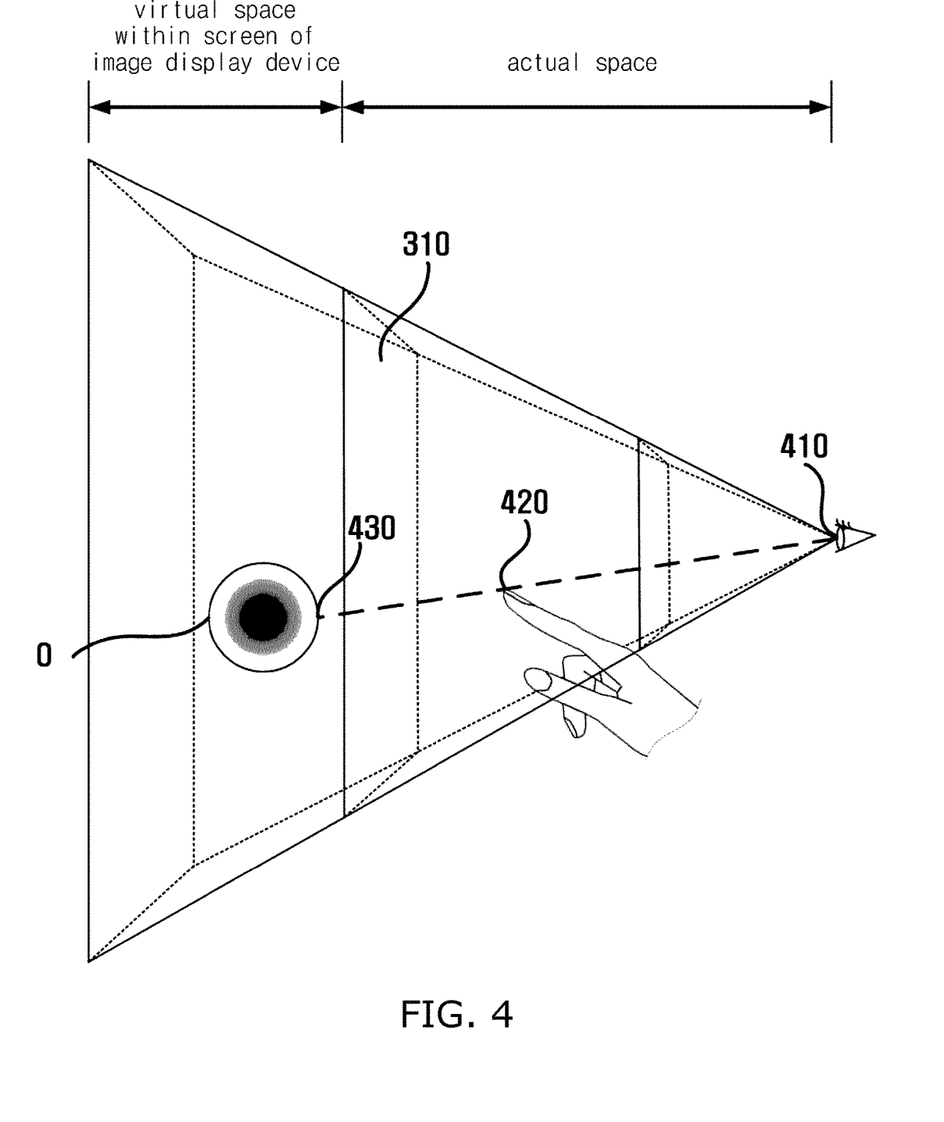
FIGS. 4 and 6 are conceptual diagrams showing the mapping of an eye and finger of a user to an action point on a screen according to an embodiment of the present invention.
Figure 5:
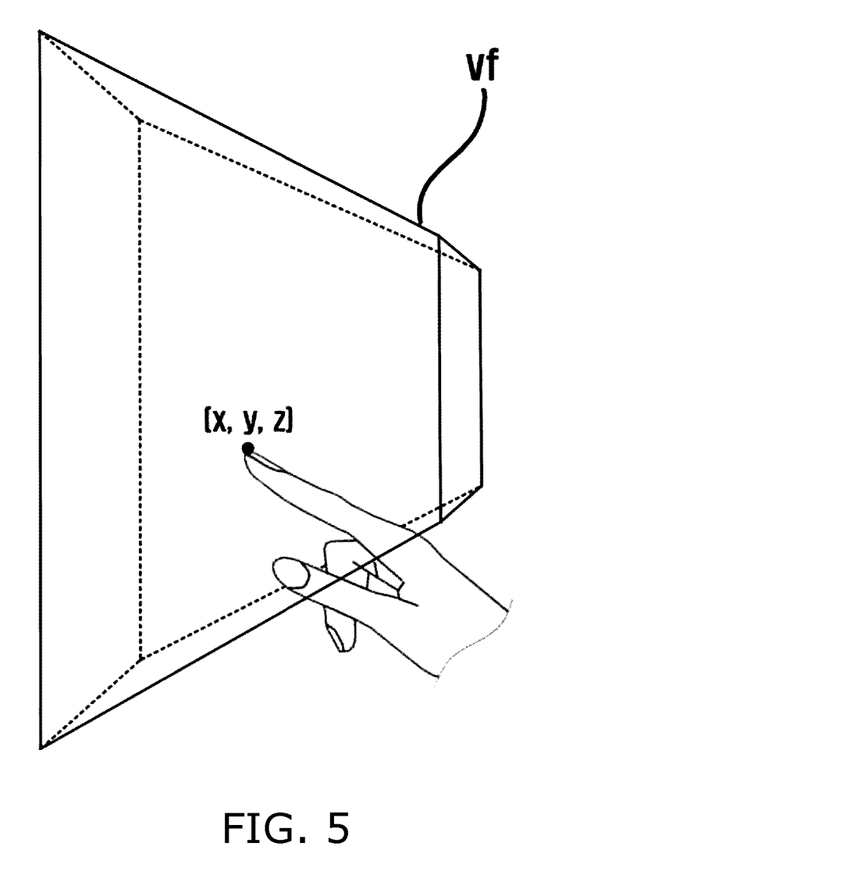
FIG. 5 is a conceptual diagram illustrating a normal space formed within a view frustum.

More specifically, within a pyramid-shaped space such as that shown in FIG. 4, an actual space between the eye of the user and the screen of the image display device 300 and a virtual space in which a 3D object O of the user interface is represented within the screen 310 of the image display device 300 may be defined. In this case, when a part of a pyramid constituting a part of the actual space is removed, a truncated view frustum (vf), such as that shown in FIG. 5, may be assumed. Furthermore, the mapping unit 220 maps information (x, y, z) about the 3D location of a finger to a point within a normal space composed of a regular hexahedron the edges of which are the same. Preferably, the normal space may be composed of a regular hexahedron the x, y and z axes of which each have only a value between −1 and 1. For example, the information (x, y, z) about the 3D location of the finger has coordinate information, such as (−0.5, 0.7, −0.8), in the normal space. Although only information about the 3D location of a single point of a finger is shown in FIG. 5, information about the 3D locations of a number of points of the finger may be mapped into the normal space when the user performs successive actions by using the finger. Furthermore, this mapping may be implemented by inversely applying a perspective projection technique.

The screen location information generation unit 230 converts the information about the 3D location of the hand, having coordinate information in the normal space, into information about a location in the virtual space within the screen by projecting the information about the 3D location of the hand onto the screen of the image display device 300. More specifically, the screen location information generation unit 230 collects a viewing angle, for performing the perspective projection of information about the location of a virtual camera oriented toward the object on the screen, a direction vector, an up vector and the normal space onto the virtual space, and applies the collected information to a perspective projection matrix, thereby converting the information about the 3D location of the hand in the normal space into information about a 3D location in the virtual space within the screen.

Figure 6:
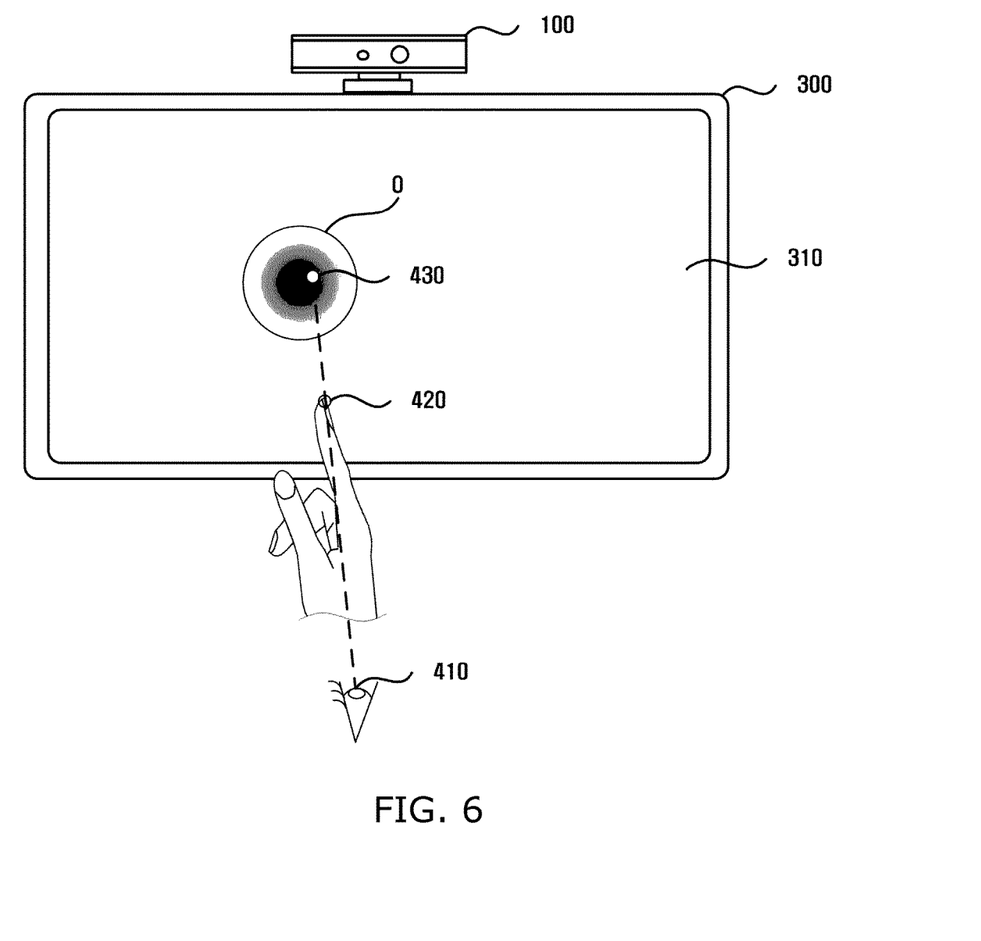

The user interface manipulation unit 240 determines the information about the 3D location in the virtual space to be the location of an action point. Furthermore, when the user changes the location of the hand, the user interface manipulation unit 240 generates related user interface execution information by changing the location of the action point in response to the change in the location of the hand, and transfers the generated related user interface execution information to the image display device 300. For example, referring to FIGS. 4 and 6, an action point 430 displayed on the screen 310 is disposed on a rectilinear line that connects the finger 420 and eye 410 of the user. When the user moves the finger 420, the action point 430 also moves to be disposed on the rectilinear line, and thus the user intuitively applies an input, such as an input for moving onto the object O displayed on the screen 310.

Via FIGS. 7 and 8, a method for providing an interface capable of recognizing an action by considering a user's viewpoint according to an embodiment of the present invention will be described in detail below. The method according to the embodiment shown in FIGS. 7 and 8 includes steps that are processed by the interface provision device 200, shown in FIGS. 2 and 3, in a time sequential manner. Accordingly, the items that are omitted below but have been described in conjunction with the interface provision device 200 may be also applied to the method that will be described below.

Figure 7:
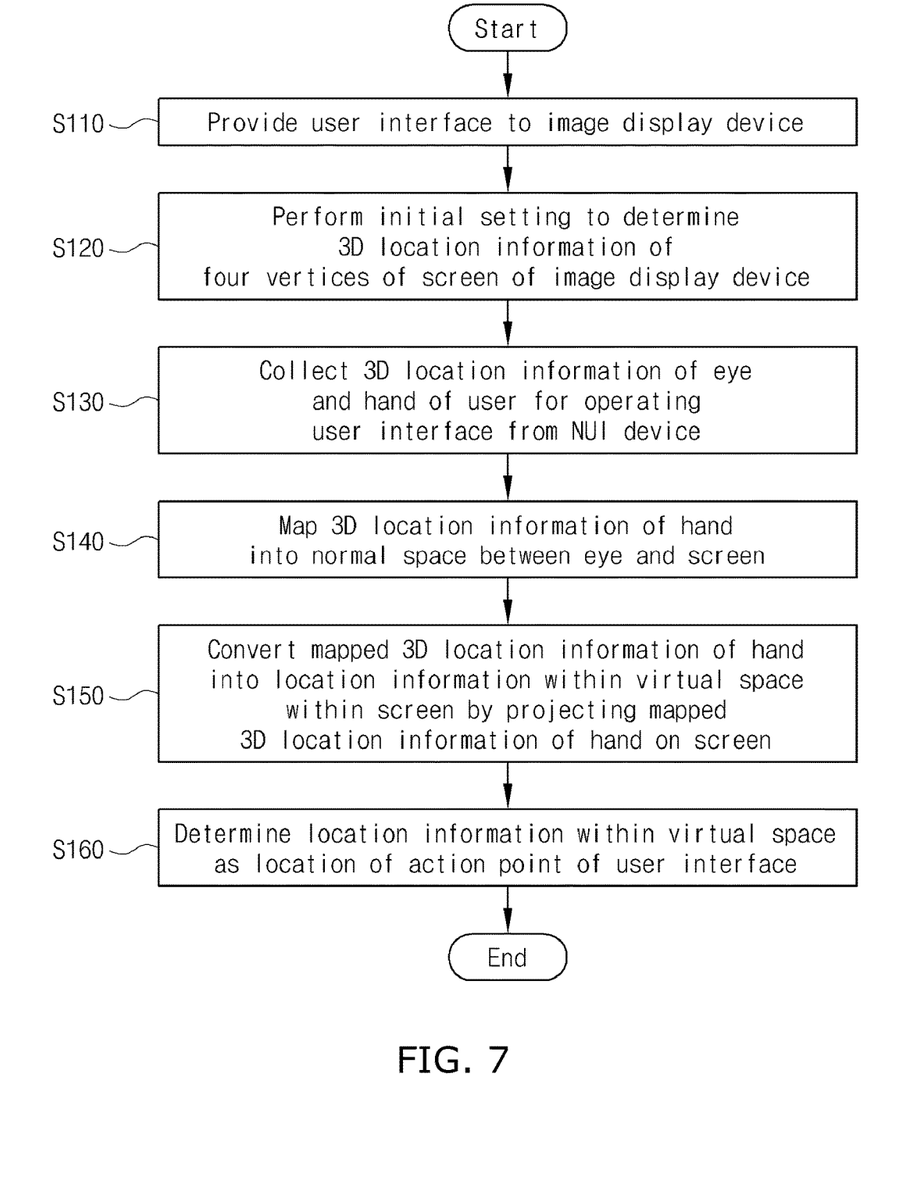
FIG. 7 is a flowchart illustrating a method for providing an interface capable of recognizing an action by considering a user's viewpoint according to an embodiment of the present invention.

First, referring to FIG. 7, the interface provision device 200 provides a user interface to the image display device 300 at step S110. The user interface is an interface that is manipulated based on the recognition of an action, and various objects may be represented in the user interface.

The interface provision device 200 performs initial setting for determining information about the 3D locations of the four vertices of the screen of the image display device 300 at step S120.

Figure 8:
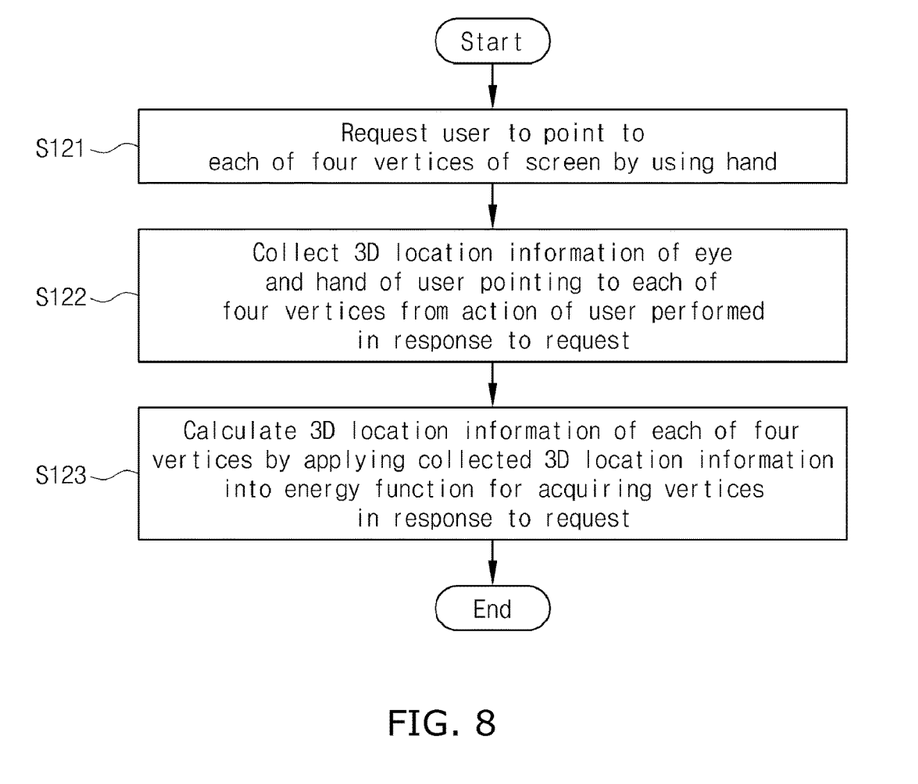
FIG. 8 is a flowchart showing step S120 of FIG. 7 in detail.

Referring to FIG. 8, at step S121, the interface provision device 200 requests a user to point to each of the four vertices by using his or her hand in order to perform step S120. When the user performs an action for each of the vertices in response to the request, the NUI device 100 may acquire information about the 3D locations of an eye and hand of the user, and the interface provision device 200 may collect information about the 3D locations of the eye and the hand for each of the vertices from the NUI device 100 at step S122. Thereafter, the interface provision device 200 calculates information about the 3D location of each of the vertices by applying the information about the 3D locations of the eye and the hand into an energy function at step S123. The energy function includes a first factor for acquiring a distance between a rectilinear line passing through the eye and the hand and each of the vertices and a second factor for determining whether the four vertices form a rectangle. The details of the calculation process have been given above.

Referring back to FIG. 7, the user performs an action of manipulating the user interface (for example, an action of dragging and moving an icon displayed on the screen), and the NUI device 100 acquires information about the 3D locations of the eye and the hand from the action. The interface provision device 200 collects the information about the 3D locations of the eye and the hand from the NUI device 100 at step S130.

The interface provision device 200 maps the information about the 3D location of the hand to a normal space between the eye and the screen of the image display device 300 at step S140. For example, information about the 3D location of the hand having location information (100, −200, 150) is normalized to a value between 1 and −1 by mapping it to the normal space. That is, the information about the 3D location of the hand may be normalized to a value, such as the value (−0.5, 0.7, 0.8).

The interface provision device 200 converts the mapped information about the 3D location of the hand into information about a location in a virtual space within the screen by performing the perspective projection of the mapped information about the 3D location of the hand onto the screen at step S150. The information about the location in the virtual space within the screen is designated as information about the location of an action point (for example, a cursor) displayed on the screen. As a result, the eye, the hand, and the action point are placed on a rectilinear line.

Thereafter, the interface provision device 200 determines the information about the location in the virtual space within the screen to be the location of an action point for manipulating the user interface at step S160.

The method according to the embodiment described via FIGS. 7 and 8 may also be implemented in the form of a storage medium including computer-executable instructions, such as a program module executed by a computer. A computer-readable medium may be any available medium accessible to a computer, and includes all volatile and non-volatile media and separable and non-separable media. Furthermore, the computer-readable medium may include both a computer storage medium and a communication medium. The computer storage medium includes all volatile and non-volatile media and separable and non-separable media implemented using any method or technique for storing information, such as computer-readable instructions, data structures, program modules, and other data. The communication medium typically includes computer-readable instructions, data structures, program modules, other data of a modulated data signal, such as carriers, or other transmission mechanisms, and also includes any information transfer media.

Furthermore, the method according to the embodiment of the present invention may be implemented using a computer program (or a computer program product) including a computer-executable instructions. The computer program includes programmable machine instructions processed by a processor, and may be implemented using a high-level programming language, an object-oriented programming language, an assembly language, or a machine language. Furthermore, the computer program may be recorded on a variety of types of computer-readable storage media (e.g., memory, a hard disk, a magnetic/optical medium, or a solid-state drive (SSD)).

Accordingly, the method according to the embodiment of the present invention may be implemented when a computer program, such as that described above, is executed by a computing device. The computing device may include at least some of a processor, memory, a storage device, a high-speed interface connected to the memory and a high-speed extension port, and a low-speed interface connected to a low-speed bus and the storage device. These components are interconnected using various buses, and may be mounted on a common motherboard or may be mounted using other appropriate methods.

In this case, the processor may process instructions within the computing device. The instructions may be, for example, instructions stored in memory or a storage device in order to display graphic information for providing a graphic user interface (GUI) on an external input/output device, such as a display connected to a high-speed interface. As another embodiment, a plurality of processors and/or a plurality of buses may be appropriately used along with a plurality of pieces of memory and a plurality of memory forms. Furthermore, the processor may be implemented using a chipset formed by chips that include a plurality of analog and/or digital processors.

Furthermore, the memory stores information within the computing device. As an example, the memory may include a volatile memory unit or a set of volatile memory units. As another example, the memory may include a non-volatile memory unit or a set of non-volatile memory units. Furthermore, the memory may be another type of computer-readable medium, such as a magnetic or optical disk.

Furthermore, the storage device may provide a large storage space to the computing device. The storage device may be a computer-readable medium, or may be a component including the computer-readable medium. For example, the storage device may also include devices within a storage area network (SAN) or other components, and may be a floppy disk device, a hard disk device, an optical disk device, a tape device, flash memory, or a similar semiconductor memory device or device array.

The above description of the present invention is merely for an illustrative purpose. It will be understood that those having ordinary knowledge in the art to which the present invention pertains can easily make modifications and variations without departing from the technical spirit and essential features of the present invention. Therefore, the above-described embodiments are illustrative in all aspects, and are not limitative. For example, each component described as being in a single form may be practiced in a distributed form. In the same manner, components described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method for providing an interface capable of recognizing an action by considering a user's view point, which is performed via an apparatus for providing an intuitive interface, the method comprising:
   (A) collecting information about a 3D location of an eye of a user, information about a 3D location of a hand of the user, and information about 3D locations of vertices of a screen of an image display device;
   (B) mapping the information about the 3D location of the hand into a canonical form of a preset volume between the eye and the screen;
   (C) converting the information about the 3D location of the hand, mapped into the canonical form, into information about a location in a virtual space within the screen by projecting the mapped information about the 3D location of the hand onto the screen of the image display device; and
   (D) determining the information about the location in the virtual space within the screen to be a location of an action point adapted to manipulate a user interface provided to the screen, wherein step (A) comprises:
(A-1) collecting the information about the 3D locations of the eye and hand of the user for an initial setting operation in which the user points to the vertices of the screen, and calculating the information about the 3D locations of the vertices of the screen of the image display device; and
(A-2) providing the user interface via the screen of the image display device, and collecting the information about the 3D locations of the eye and hand of the user for operation of the user interface,
wherein step (A-1) comprises:
(a) collecting the information about the 3D locations of the eye and hand of the user for each of the vertices for the initial setting operation in which the user away from the image display device points to each of the plurality of vertices constituting the screen by using the hand; and
(b) for each of the vertices, acquiring information about the 3D locations of the plurality of vertices by acquiring 3D coordinates of the vertices that enable a first factor, adapted to acquire a distance between a rectilinear line passing through the collected information about the 3D locations of the eye and hand of the user and each of the vertices, to have a minimum value, and
acquiring information about the 3D locations of the plurality of vertices by additionally considering a second factor adapted to determine whether a polygon formed by connecting the plurality of vertices becomes a rectangle.

2. The method of claim 1, wherein:
the second factor is an equation for a size of an inner product between vectors each connecting two neighboring vertices of the plurality of vertices; and
step (b) comprises acquiring the information about the 3D locations of the plurality of vertices by acquiring 3D coordinates of the plurality of vertices that enable the first factor and the second factor to have minimum values.

3. The method of claim 2, wherein step (b) comprises:
multiplying the second factor by a preset weight, and acquiring the information about the 3D locations of the plurality of vertices that enable a sum of a product between the second factor and the weight and the first factor to have a minimum value.

4. The method of claim 1, wherein step (B) comprises:
generating a view frustum including the collected information about the 3D location of the eye and the plurality of vertices for the screen of the image display device; and
mapping the collected information about the 3D location of the hand into the canonical form of a regular hexahedron by inversely applying a perspective projection technique to the collected information about the 3D location of the hand located within the view frustum.

5. The method of claim 1, wherein step (C) comprises:
converting the information about the 3D location of the hand within the canonical form into the information about the location in the virtual space within the screen by applying a viewing angle, adapted to perform perspective projection of information about a location of a virtual camera, oriented toward the user interface displayed on the screen of the image display device, vector information, and the canonical form onto the virtual space of the screen, to a perspective projection matrix.

6. A computer program stored in a non-transitory computer-readable storage medium to perform the method for providing an interface capable of recognizing an action by considering a user's view point according to claim 1.

7. A non-transitory computer-readable storage medium having stored thereon a computer program code for performing the method for providing an interface capable of recognizing an action by considering a user's view point according to claim 1.

8. An apparatus for providing an interface capable of recognizing an action by considering a user's view point, the apparatus comprising:
a location information collecter configured to collect information about a 3D location of an eye of a user, information about a 3D location of a hand of the user, and information about 3D locations of vertices of a screen of an image display device;
a mapper configured to map the information about the 3D location of the hand into a normal space of a preset volume between the eye and the screen;
a screen location information generator configured to convert the information about the 3D location of the hand, mapped into the normal space, into information about a location in a virtual space within the screen by projecting the mapped information about the 3D location of the hand onto the screen of the image display device; and
a user interface manipulater configured to determine the information about the location in the virtual space within the screen to be a location of an action point for manipulating a user interface provided to the screen,
wherein the location information collecter comprises:
a screen vertex location information acquisiter configured to collect the information about the 3D locations of the eye and hand of the user for an initial setting operation in which the user points to the vertices of the screen, and to calculate the information about the 3D locations of the vertices of the screen of the image display device; and
a user body location information collecter configured to provide the user interface via the screen of the image display device, and to collect the information about the 3D locations of the eye and hand of the user for operation of the user interface,
wherein the screen vertex location information acquisiter:
collects the information about the 3D locations of the eye and hand of the user for each of the vertices for the initial setting operation in which the user away from the image display device points to each of the plurality of vertices constituting the screen by using the hand;
for each of the vertices, acquires information about the 3D locations of the plurality of vertices by acquiring 3D coordinates of the vertices that enable a first factor, adapted to acquire a distance between a rectilinear line passing through the collected information about the 3D locations of the eye and hand of the user and each of the vertices, to have a minimum value; and
acquires information about the 3D locations of the plurality of vertices by additionally considering a second factor adapted to determine whether a polygon formed by connecting the plurality of vertices becomes a rectangle.

9. The apparatus of claim 8, wherein:
the second factor is an equation for a size of an inner product between vectors each connecting two neighboring vertices of the plurality of vertices; and the screen vertex location information acquisiter acquires the information about the 3D locations of the plurality of vertices by acquiring 3D coordinates of the plurality of vertices that enable the first factor and the second factor to have minimum values.

10. The apparatus of claim 9, wherein the screen vertex location information acquisiter:
multiplies the second factor by a preset weight, and acquires the information about the 3D locations of the plurality of vertices that enable a sum of a product between the second factor and the weight and the first factor to have a minimum value.

11. The apparatus of claim 8, wherein the mapper:
generates a view frustum including the collected information about the 3D location of the eye and the plurality of vertices for the screen of the image display device; and
maps the collected information about the 3D location of the hand into the canonical form of a regular hexahedron by inversely applying a perspective projection technique to the collected information about the 3D location of the hand located within the view frustum.

12. The apparatus of claim 8, wherein the screen location information generater:
converts the information about the 3D location of the hand within the canonical form into the information about the location in the virtual space within the screen by applying a viewing angle, adapted to perform perspective projection of information about a location of a virtual camera, oriented toward the user interface displayed on the screen of the image display device, vector information, and the canonical form onto the virtual space of the screen, to a perspective projection matrix.

* * * * *